(12) United States Patent
Zou et al.

(10) Patent No.: US 11,110,558 B2
(45) Date of Patent: Sep. 7, 2021

(54) TURNING/MILLING SYSTEM AND TURNING/MILLING METHOD

(71) Applicant: Guangdong Everwin Precision Technology Co., Ltd., Dongguan (CN)

(72) Inventors: Xiaohong Zou, Dongguan (CN); Xiangsheng Ren, Dongguan (CN); Wanhui Gan, Dongguan (CN)

(73) Assignee: GUANGDONG EVERWIN PRECISION TECHNOLOGY CO., LTD., Guangdong (CN)

( * ) Notice: Subject to any disclaimer, the term of this patent is extended or adjusted under 35 U.S.C. 154(b) by 27 days.

(21) Appl. No.: 16/082,425

(22) PCT Filed: Mar. 22, 2017

(86) PCT No.: PCT/CN2017/077645
§ 371 (c)(1),
(2) Date: Sep. 5, 2018

(87) PCT Pub. No.: WO2017/167089
PCT Pub. Date: Oct. 5, 2017

(65) Prior Publication Data
US 2019/0084101 A1 Mar. 21, 2019

(30) Foreign Application Priority Data

Mar. 28, 2016 (CN) .......................... 201610181881.0
Mar. 28, 2016 (CN) .......................... 201610187274.5

(51) Int. Cl.
*B23C 3/04* (2006.01)
*B23P 17/02* (2006.01)
(Continued)

(52) U.S. Cl.
CPC .................. *B23Q 1/48* (2013.01); *B23C 1/06* (2013.01); *B23C 3/04* (2013.01); *B23C 3/16* (2013.01);
(Continued)

(58) Field of Classification Search
CPC . Y10T 409/303752; Y10T 409/303808; Y10T 409/305656–305824; Y10T 29/49995; Y10T 29/49996; B23C 3/04
(Continued)

(56) References Cited

U.S. PATENT DOCUMENTS

2006/0270540 A1 11/2006 Takayama et al.
2009/0112356 A1* 4/2009 Abe ..................... G05B 19/409
700/193
(Continued)

FOREIGN PATENT DOCUMENTS

CN 101234474 A 8/2008
CN 201192779 Y 2/2009
(Continued)

OTHER PUBLICATIONS

International Search Report related to Application No. PCT/CN2017/077645 reported on Jun. 19, 2017.
(Continued)

*Primary Examiner* — Erica E Cadugan
(74) *Attorney, Agent, or Firm* — Carlson, Gaskey & Olds

(57) ABSTRACT

Provided is a turning and milling system, comprising: a work platform comprising a first drive mechanism; a rotating platform, said first drive driving said rotating platform to rotate on the said work platform and drive a workpiece to rotate about a vertical axis; a blade assembly comprising a blade and a second drive mechanism connected to the blade;
(Continued)

said second drive mechanism drives the blade to move in the horizontal direction, changing the machining radius of the blade.

12 Claims, 4 Drawing Sheets

(51) Int. Cl.
*B23Q 1/48* (2006.01)
*B23C 1/06* (2006.01)
*B23C 3/16* (2006.01)
*B23C 9/00* (2006.01)
*B23Q 15/013* (2006.01)

(52) U.S. Cl.
CPC ............ *B23C 9/00* (2013.01); *B23P 17/02* (2013.01); *B23Q 15/013* (2013.01); *B23Q 2220/004* (2013.01); *Y10T 29/49996* (2015.01); *Y10T 29/5114* (2015.01); *Y10T 409/303808* (2015.01); *Y10T 409/305768* (2015.01)

(58) Field of Classification Search
USPC ............ 409/131–132, 165–168; 29/557–558
See application file for complete search history.

(56) References Cited

U.S. PATENT DOCUMENTS

| | | | | |
|---|---|---|---|---|
| 2012/0312133 | A1* | 12/2012 | Trzaskos | B23B 5/36 82/1.11 |
| 2014/0165348 | A1* | 6/2014 | Yang | B23B 3/065 29/56.5 |
| 2014/0165349 | A1* | 6/2014 | Yang | B23D 11/00 29/56.5 |
| 2014/0165371 | A1* | 6/2014 | Yang | B23B 5/36 29/558 |
| 2014/0165375 | A1* | 6/2014 | Yang | B23D 5/00 29/558 |
| 2014/0172145 | A1* | 6/2014 | Yang | B23Q 39/024 700/160 |
| 2014/0172146 | A1* | 6/2014 | Yang | B23Q 39/024 700/160 |
| 2015/0293519 | A1* | 10/2015 | Maeda | G05B 19/19 700/186 |

FOREIGN PATENT DOCUMENTS

| | | |
|---|---|---|
| CN | 103079736 A | 5/2013 |
| CN | 103567460 A | 2/2014 |
| CN | 103567466 A | 2/2014 |
| CN | 103878635 A | 6/2014 |
| CN | 105798632 A | 7/2016 |
| CN | 105798633 A | 7/2016 |
| CN | 205600319 U | 9/2016 |
| EP | 2537628 A1 | 12/2012 |
| JP | 2002126972 A | 5/2002 |
| JP | 2008183666 A | 8/2008 |
| JP | 2014121769 A | 7/2014 |

OTHER PUBLICATIONS

Office Action for Chinese Patent Application No. 201610181881.0 dated May 4, 2017.
Office Action for Chinese Patent Application No. 201610187274.5 dated May 17, 2017.
Korean Patent Application No. 10-2018-7028146, Notification of Reason for Refusal dated Jan. 22, 2020.

* cited by examiner

TURNING/MILLING SYSTEM AND TURNING/MILLING METHOD

CROSS-REFERENCE TO RELATED APPLICATION

This application is a 35 USC 371 U.S. national stage of International Application No. PCT/CN2017/077645 filed on Mar. 22, 2017, which claims the benefit of Chinese Patent Application No. CN 201610187274.5, filed on Mar. 28, 2016 entitled "Turning/Milling System And Turning/Milling Process" and to Chinese Patent Application No. CN 201610181881.0, filed on Mar. 28, 2016 entitled "Turning/Milling System And Turning/Milling Process", the entire content of which are incorporated herein its entirely.

TECHNICAL FIELD

The present disclosure relates to the field of turning and milling machining, and particularly relates to a turning and milling system and a turning and milling method.

BACKGROUND

Due to convenience in machining, higher flexibility, and higher grade, the housings made of aluminum alloy or the like can effectively increase the added value of the products and are broadly used in the electronics industry, such as being machined into a mobile phone housing, a tablet housing, or the like. Generally, these frequently used housings have curved surfaces on the corners, and the curved surfaces are complex and lots of the curved surfaces are irregular curved surfaces.

In a conventional computerized numerical control (CNC) machining method, a workpiece is fixed on a machine tool, a cutter above the machine tool goes around the workpiece to cut the edge curved surfaces and the corner curved surfaces. Since the speed is relatively slow, machining the corner curved surfaces of the workpiece takes more than ten minutes, the machining time is relatively long. Also, the machined corner curved surfaces are hard to meet the standard with a lower machining quality, and the machined corner curved surfaces are too rough to reach a quality of fine grinding or super fine grinding, therefore a secondary precision machining is required, making the overall process more complex.

SUMMARY

Accordingly, it is necessary to provide a turning and milling system and a turning and milling method with a higher machining efficiency and simple procedures.

A turning and milling system includes:

a worktable including a first drive mechanism;

a rotary table provided on the worktable and connected to the first drive mechanism, the rotary table is provided with a work station configured to fix a workpiece, and the first drive mechanism drives the rotary table to rotate on the worktable and enable the workpiece to rotate about a vertical axis; and a cutter assembly provided above the worktable, comprising a cutter and a second drive mechanism connected to the cutter, the second drive mechanism drives the cutter to move along a vertical direction, and the second drive mechanism further drives the cutter to move along a horizontal direction, so as to change a machining radius of the cutter;

a curved surface machining to the workpiece by the cutter is achieved via an cooperation of a rotation of the workpiece driven by the rotary table and a horizontal movement and a vertical movement of the cutter driven by the second drive mechanism.

A turning and milling method includes:

positioning a workpiece on a work station on a rotary table, and enabling a surface of the workpiece to be machined to protrude from the rotary table;

establishing a three-dimensional coordinate system O-XYZ, axis Z is a vertical axis where a geometric center where a machining area of the workpiece is located, axis X and axis Y are horizontal axes perpendicular to each other; inputting parameters of a model workpiece into a control terminal, calculating axis Z coordinate values corresponding to a top and edge curved surfaces according to the inputted parameters, then obtaining machining depths of a cutter at different positions along the axis Z; and setting a radius variation rate of the cutter and a rotation frequency of the rotary table, enabling the cutter to perform machining along a spiral path about a geometric center of a machining area of the workpiece as an origin, and the machining comprises a machining to corners of the workpiece, a turning and milling of a top surface, and a machining to edge curved surfaces; during the machining to the corners of the workpiece, the second drive mechanism is controlled to enable the cutter to move to an outer side of a first machining position on a corner of the workpiece, and the first drive mechanism is controlled to drive the rotary table to enable the workpiece to rotate about the vertical axis of the workpiece, and the second drive mechanism is also controlled to enable the cutter to move vertically according to the machining depths on the axis Z corresponding to different machining sites on four corners of the workpiece; meanwhile, the second drive mechanism drives the cutter to gradually reduce the machining radius until a curved surface machining to the four corners of the workpiece is completed.

A turning and milling system includes:

a worktable comprising a first drive mechanism;

a rotary table provided on the worktable and connected to the first drive mechanism, the rotary table is provided with a work station configured to position a workpiece, and the first drive mechanism drives the rotary table to rotate on the worktable and enable the workpiece to rotate about a vertical axis, and drives the rotary table to move along a first direction in a horizontal plane; and a cutter assembly provided above the worktable, comprising a cutter and a second drive mechanism connected to the cutter, the second drive mechanism drives the cutter to move along a vertical direction, and the second drive mechanism further drives the cutter to move along a second direction perpendicular to the first direction in the horizontal plane, so as to change a machining radius of the cutter;

a curved surface machining to the workpiece by the cutter is achieved via an cooperation of a rotation of the workpiece driven by the rotary table and a horizontal movement and a vertical movement of the cutter driven by the second drive mechanism.

A turning and milling method includes:

positioning a workpiece on a work station on a rotary table, and enabling a surface of the workpiece to be machined to protrude from the rotary table;

establishing a three-dimensional coordinate system O-XYZ, axis Z is a vertical axis where a geometric center of a machining area of the workpiece is located, axis X and axis Y are horizontal axes perpendicular to each other; inputting parameters of a model workpiece into a control terminal, calculating axis Z coordinate values corresponding to a top surface and edge curved surfaces according to the inputted parameters, then obtaining machining depths of a cutter at different positions along the axis Z; and setting a radius variation rate of the cutter and a rotation frequency of the rotary table, enabling the cutter to perform machining along a spiral path about a geometric center of a machining area of the workpiece as an origin, the machining comprises a machining to corners of the workpiece, a turning and milling of a top surface, and a machining to edge curved surfaces; during the machining to the corners of the workpiece, the cutter is positioned at an outer side of a first machining position on a corner of the workpiece, and the first drive mechanism is controlled to drive the rotary table to enable the workpiece to rotate about the vertical axis of the workpiece, and the second drive mechanism is also controlled to enable the cutter to move up and side according to the machining depths on the axis Z corresponding to different machining sites on four corners of the workpiece; meanwhile, and the second drive mechanism drives the cutter to gradually reduce the machining radius until a curved surface machining to the four corners of the workpiece is completed.

The details of one or more embodiments of present disclosure are set forth in the accompanying drawings and the description below. Other features, objects, and advantages of present disclosure will be apparent from the description and drawings, and from the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Embodiments of the present disclosure are described more fully hereinafter with reference to the accompanying drawings. A preferred embodiment is described in the accompanying drawings. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

It will be understood that, when an element is referred to as being "connected" or "coupled" to another element, it can be directly connected or coupled to the other element or intervening elements may be present. As used herein, the terms "left", "right" and the like are merely for the illustrative purpose, and are not meant to be the only embodiments.

Unless otherwise defined, all terms (including technical and scientific terms) used herein have the same meaning as commonly understood by one of ordinary skill in the art to which this invention belongs. The terms used herein is for the purpose of describing particular embodiments only and is not intended to limit the present disclosure. As used herein, the term "and/or" includes any and all combinations of one or more of the associated listed items.

Figure 1:
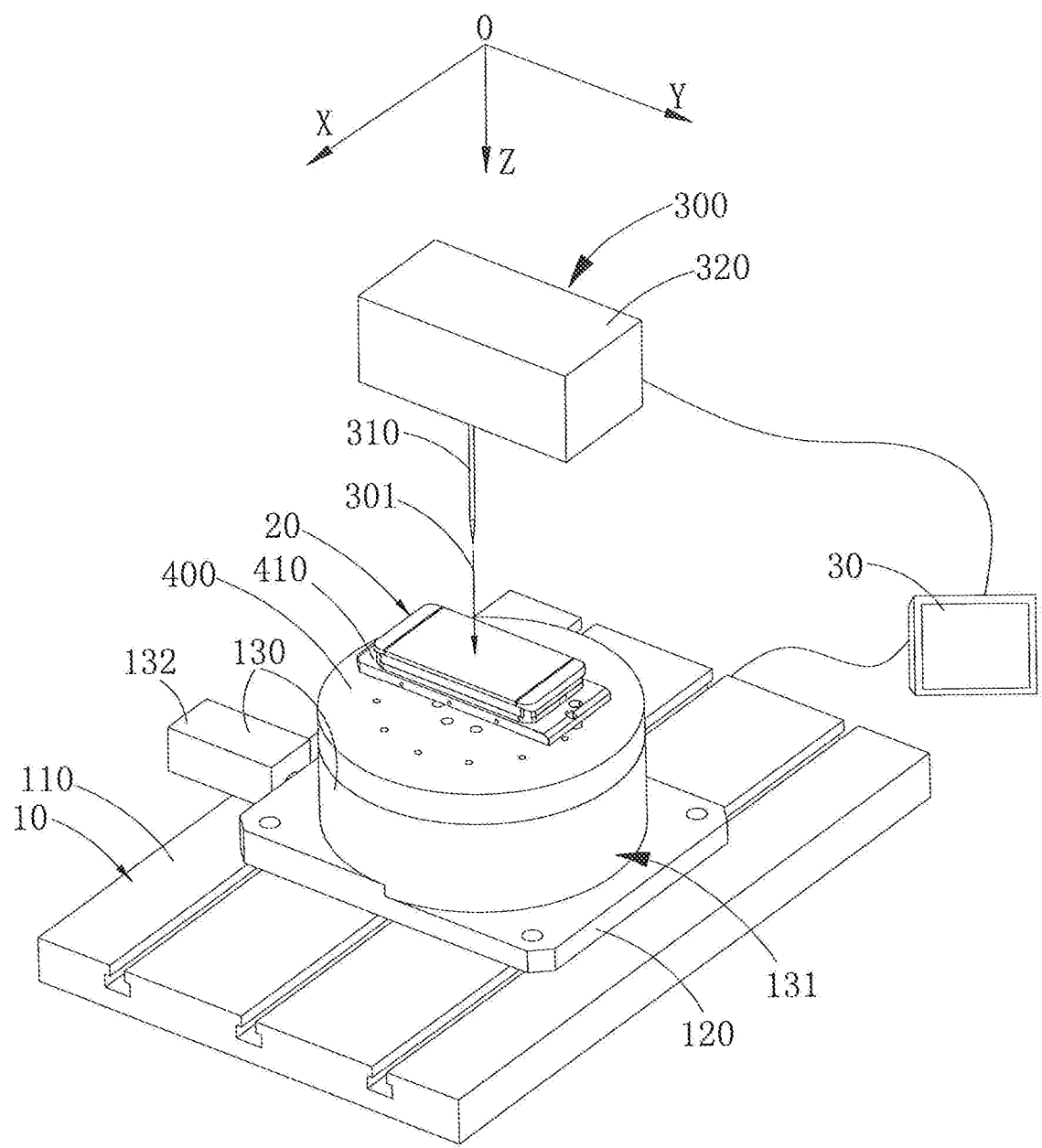
FIG. 1 is a perspective view of a turning and milling system according to an embodiment.
Figure 6:
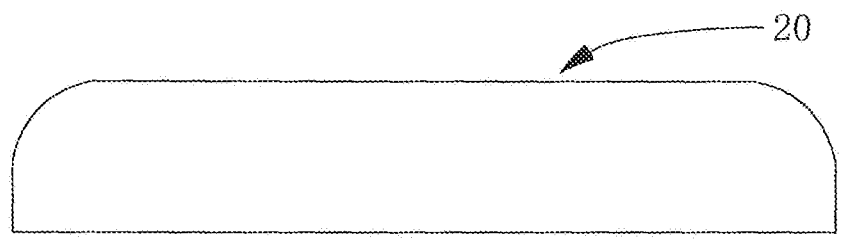
FIG. 6 is a cross-sectional view of the workpiece.

Referring to FIG. 1, a turning and milling system according to an embodiment includes a worktable 10, a rotary table 400 and a cutter assembly 300. For convenience of description, a three dimensional coordinate shown in FIG. 1 is defined in the turning and milling system, axis Z is a vertical axis 301 extending through a geometric center of the workpiece 20, and axis X and axis Y are horizontal axes that are perpendicular to each other. The worktable 10 includes a first drive mechanism 130. The rotary table 400 is provided on the worktable 10. The first drive mechanism 130 is connected to the rotary table 400 and drives the rotary table 400 to rotate on the worktable about the vertical axis 301. The rotary table 400 is provided with a work station used to position the workpiece 20. The workpiece 20 can be a housing made of aluminum alloy or the like, such as a mobile phone housing. A top surface and an upper portion of the workpiece 20 are machined and a lower portion of the workpiece 20 is clamped and fixed by the rotary table 400, and the curved surfaces of the upper portion of the finished product are inclined inward, as shown in FIG. 6. The cutter assembly 300 includes a cutter 310 and a second drive mechanism 320 connected to the cutter 310. The cutter 310 and the second drive mechanism 320 are both provided above the worktable 10. The second drive mechanism 320 drives the cutter 310 to move along the axis Z, and further drives the cutter 310 to move along the axis X in a horizontal plane, so as to change a machining radius of the cutter 310. A curved surface machining to the workpiece 20 by the cutter 310 is achieved via an cooperation of a rotation of the workpiece 20 enabled by the rotary table 400 driven by the first drive mechanism 130 in the horizontal plane and movements along the axis X and the axis Z of the cutter 310 driven by the second drive mechanism 320.

Specifically, the turning and milling system further includes a control terminal 30, which is connected to the first drive mechanism 130 and the second drive mechanism 320, respectively. The control terminal 30 is used to control the first drive mechanism 130 to drive the rotary table 400 to rotate on the worktable 10, and to control the second drive mechanism 320 to enable the cutter 310 to move vertically and drive the cutter 310 to change the machining radius. The control terminal 30 controls rotation frequencies of the drive mechanisms and walking paths of parts. The control terminal 30 is also used to control the first drive mechanism 130 to enable the rotary table 400 to move horizontally along the axis Y.

The worktable 10 includes a base 110, the first drive mechanism 130 provided on the base 110, and a support plate 120 movably provided on the base 110. The support plate 120 can move along the axis Y on the worktable 10. The first drive mechanism 130 is a driving motor 131 provided on the base 110. The rotary table 400 includes a rotating block connected to the driving motor 131. A fastening member 410 used to fix the workpiece 20 is provided on a top surface of the rotating block. The fastening member 410 forms a work station, the driving motor 131 drives the rotating block to rotate horizontally, thereby enabling the workpiece 20 to rotate about the axis Z.

In one of the embodiments, the first drive mechanism 130 drives the rotary table 400 to move along the axis Y in the horizontal plane, and the second drive mechanism 320 drives the cutter 310 to move along the axis X in the horizontal plane, so as to position the cutter 310 on a geometric center of a machining area of the workpiece 20, and start the turning and milling machining to a top surface of the workpiece 20. The movement of the rotary table 400 along the axis Y can be used to determine the geometric center of workpieces with different types, and the rotary table 400 is immobilized at the direction of the axis Y during the machining procedure.

In one of the embodiments, the first drive mechanism 130 includes two driving motors, one driving motor 131 is used to drive the rotary table 400 to rotate, and the other driving motor 132 is connected to the support plate 120 and is used to drive the rotary table 400 to move along the direction of the axis Y. The second dive mechanism 320 not only controls the cutter 310 to move along the axis X, but also controls a rotation of the cutter 310 itself.

In one of the embodiments, the first drive mechanism 130 drives the rotary table 400 to enable the workpiece 20 to rotate horizontally about the vertical axis 301 where the geometric center of the machining area of the workpiece 20 is located. In other words, during the curved surface machining to the workpiece 20, the workpiece 20 rotates about the vertical axis 301 of the geometric center of the machining area of the workpiece 20, and the cutter 310 moves vertically, so as to achieve machining to complex corner curved surfaces and edge curved surfaces.

In an alternative embodiment, a turning and milling system also includes the worktable 10, the rotary table 400 and the cutter assembly 300. The first drive mechanism 130 drives the rotary table 400 to rotate on the worktable 10 and enable the workpiece 20 to rotate about the vertical axis 301, and drives the rotary table 400 to move along a first direction in the horizontal plane. The second drive mechanism 320 drives the cutter 310 to move along a vertical direction, and the second drive mechanism 320 further drives the cutter 310 to move along a second direction in the horizontal plane, so as to change a machining radius of the cutter 310. The second direction is perpendicular to the first direction.

The control terminal 30 is used to control the first drive mechanism 130 to drive the rotary table 400 to rotate on the worktable 10, and drive the rotary table 400 to move along the first direction in the horizontal plane, and to control the second drive mechanism 320 to enable the cutter 310 to move vertically and drive the cutter 310 to move along the second direction in the horizontal plane, so as to change the machining radius.

The cutting edge of the cutter 310 can have a variable diameter, that is, the diameter of the cutting edge is gradually decreased from the top to the bottom. During the turning and milling to the top surface of the workpiece 20, a cutting radius of the cutter 310 can be changed.

Preferably, the second drive mechanism 320 drives the cutter 310 to move vertically at a frequency greater than or equal to 400 times per minute to achieve the machining to the curved surfaces of the workpiece 20 by the cutter 310. Therefore, the machining time of curved surfaces and the overall workpiece 20 is significantly decreased, the working efficiency is increased, and the need of machining a large amount of the workpieces 20 is satisfied.

With the turning and milling system according to the illustrated embodiment, the surface roughness of the machined workpiece 20 is greatly reduced, and the quality of the super-fine grinding or polishing can be achieved, the surface profile is also greatly reduced, and the error with the standard curved surface is greatly reduced.

Figure 2:
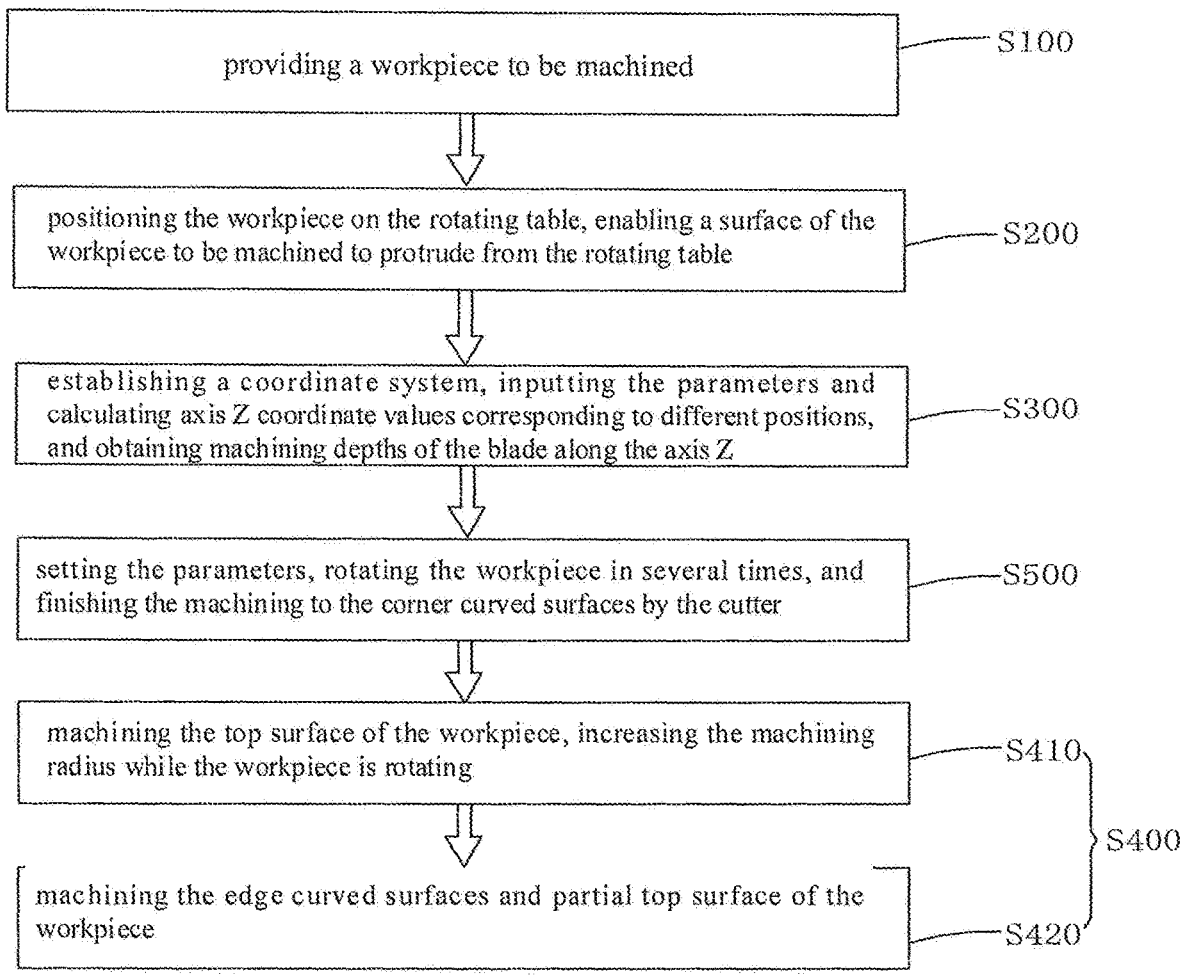
FIG. 2 is a flow chart of a turning and milling method according to an embodiment.

Referring to FIG. 2, a turning and milling method according to an embodiment includes:

In step S100, a workpiece 20 to be machined is provided, the workpiece 20 can be an aluminum alloy housing or aluminum-alloy-like housing, such as an aluminum alloy mobile phone housing to be machined.

In step S200, the workpiece 20 is positioned on a work station on a rotary table 400, a surface of the workpiece 20 to be machined is made to protrude from the rotary table 400, and a top surface of the workpiece 20 is parallel with a horizontal plane.

In step S300, a three-dimensional coordinate system O-XYZ is established, axis Z is a vertical axis where a geometric center of a machining area of the workpiece 20 is located, axis X and axis Y are horizontal axes perpendicular to each other, and a position directly above a geometric center of a machining area of the workpiece 20 is an origin O. The parameters mentioned above can be changed in the control terminal 30 when a workpiece with other size is to be machined. Parameters of a model workpiece is inputted into a control terminal 30, axis Z coordinate values corresponding to a top surface and edge curved surfaces are calculated according to the inputted parameters, then machining depths of a cutter 310 at different positions along the axis Z are obtained. For example, the size of the model workpiece and the curvatures of the curved surfaces are input, and the axis Z coordinate values in the three-dimensional coordinate system corresponding to the different machining sites on the plane XY are calculated according to the parameters. During the machining to the top surface, the axis Z coordinate values corresponding to the top surface of the workpiece 20 are identical. During the machining to the curved surfaces, due to the different curvatures, the axis Z coordinate values corresponding to the edge curved surfaces of the workpiece 20 are different, the axis Z coordinate values presents the machining depths of the cutter 310 on the axis Z.

In step S400, a radius variation rate of the cutter 310 and a rotation frequency of the rotary table 400 are set, the cutter 310 performs the machining along a spiral path about the geometric center of a machining area of the workpiece 20 as the origin. According to the three-dimensional coordinate values in the system O-XYZ, the cutter 310 changes the machining depths on the axis Z on the machining sites corresponding to the axis X and Y coordinate values of the spiral path, so as to perform turning and milling to the top surface and the edge curved surfaces of the workpiece 20. The radius variation rate of the cutter 310 is a moving rate of the cutter 310 along the direction of the axis X (i.e., a changing rate of the machining radius). The machining to the top surface and the curved surface of the workpiece 20 by the cutter 310 is achieved via a cooperation of a rotation of the workpiece 20 driven by the rotary table 400 and a movement of the cutter 310 driven by the second drive mechanism 320.

Specifically, the machining includes three types of machining, i.e., a machining to corners of the workpiece 20, a turning and milling machining to the top surface, and a machining to the edge curved surface.

In step S500, the second drive mechanism 320 is controlled to enable the cutter 310 to move to an outer side of a first machining position on a corner of the workpiece 20, the first drive mechanism 130 is controlled to drive the rotary table 400 to enable the workpiece 20 to rotate about the vertical axis of the workpiece 20, and the second drive mechanism 320 is also controlled to enable the cutter 310 to move vertically according to the machining depths on the axis Z corresponding to different machining sites on four corners of the workpiece 20. Meanwhile, the second drive mechanism 320 drives the cutter 310 to gradually reduce the machining radius until the curved surface machining to the four corners of the workpiece 20 is completed. After the first drive mechanism 130 is controlled to drive the rotary table 400 to enable the workpiece 20 to rotate in a plurality of times, the curved surface machining to the cutter 310 to the four corners of the workpiece 20 is completed.

Figure 4:
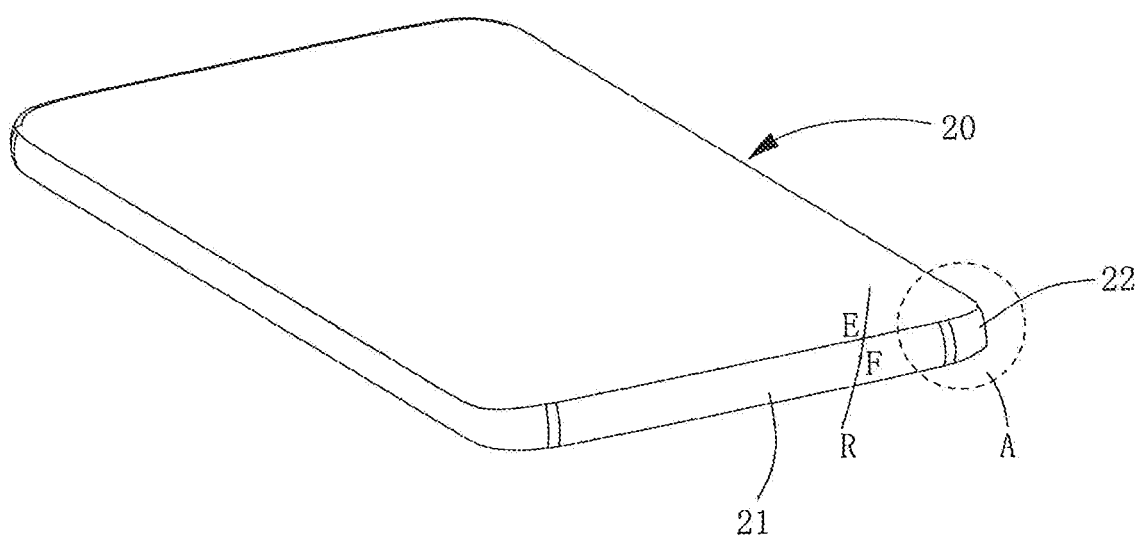
FIG. 4 is a perspective view of the workpiece.
Figure 5:
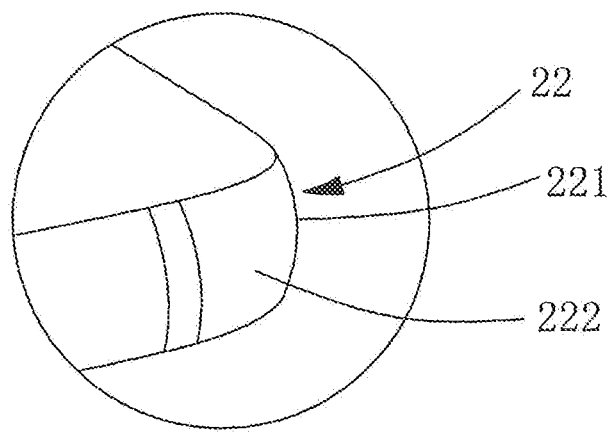
FIG. 5 is an enlarged view of the portion A of FIG. 4.
Figure 7:
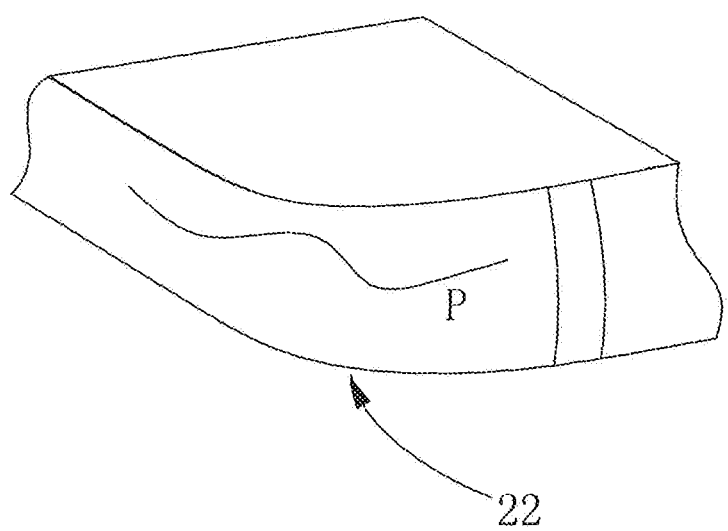
FIG. 7 is a perspective of machining to a corner of the workpiece.

It should be noted that, during the machining to the corner curved surfaces, the curvatures of the curved surfaces on one corner are complex, in this time, the rotary table 400 rotates at a low speed, and the rotating rate is about 20 to 40 rpm. Referring to FIG. 4 and FIG. 5, the corner 22 includes a middle portion 221 and a side portion 222 located on the middle portion, the curvatures of each of the portions are varied, during the machining, when one side of the corner is completed, the cutter 310 has to be raised quickly to machine the middle portion of the corner, then lowered quickly to machine the other side of the corner. As shown in FIG. 7, the path P of the cutter 310 on the corner is convex in its middle. At the same time, during the machining procedure, after a rotation of the rotary table 400, the second drive mechanism 320 enables the cutter 310 to move along the axis X in the horizontal plane, so as to gradually reduce the machining radius of the cutter 310. It means, during the machining procedure, the machining radius of the cutter 310 is gradually reduces from greater to smaller, and the machining is from outside to inside.

Figure 3:
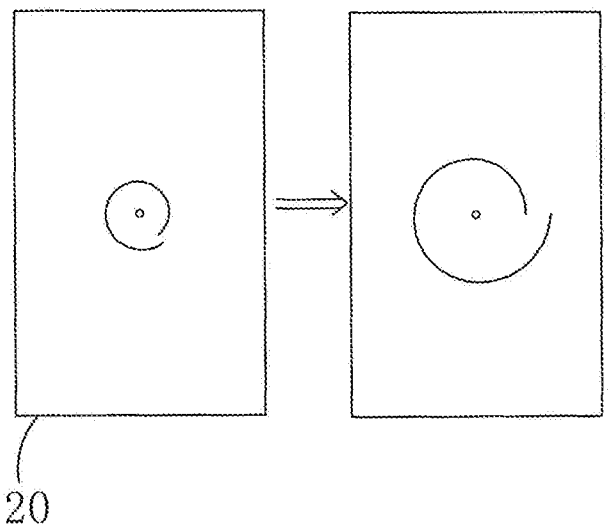
FIG. 3 is a procedure variation view when a cutter is turning and milling a top surface of the workpiece.

In step S410, referring to FIG. 3, after the machining to the four corners is completed, the turning and milling machining to the top surface of the workpiece 20 includes: the second drive mechanism 320 drives the cutter 310 to move along the axis X, the cutter 310 is positioned at the geometric center of the machining area of the workpiece 20, and the second drive mechanism 320 drives the cutter 310 to move horizontally along the top surface of the workpiece 20, so as to gradually increase the machining radius. Meanwhile, the first drive mechanism 130 drives the rotary table 400 to enable the workpiece 20 to rotate horizontally about the axis Z, so as to achieve a turning and milling of the top surface of the workpiece 20, and at this time, the machining depth of the cutter 310 on the axis Z is constant. It means, while the workpiece 20 is rotating, the cutter 310 moves along the axis X at a certain rate, so as to gradually increase the machining radius.

When the machining radius of the cutter 310 is increased to the edges of the workpiece 20, a machining process to a partial top surface and the edge curved surfaces of the workpiece 20 includes:

In step S420, the first drive mechanism 130 drives the rotary table 400 to enable the workpiece 20 to rotate about the axis Z, the second drive mechanism 320 drives the cutter 310 to move vertically along the axis Z according to the axis Z coordinate values of each of the machining sites on the partial top surface and the edge curved surfaces of the workpiece 20, so as to raise and lower the cutter 310 quickly according to the different machining depths. The first drive mechanism 130 drives the rotary table 400 to enable the workpiece 20 to rotate, meanwhile, the second drive mechanism 320 drives the cutter 310 to gradually increase the machining radius until the machining to all of the top surface and the edge curved surfaces is completed. During the machining to the edge curved surfaces of the workpiece 20, while the workpiece 20 is rotating horizontally, the second drive mechanism 320 determines the corresponding axis Z coordinate value according to the obtained path, so as to change the machining depth of the cutter 310 in real time when performs the machining to the edge curved surfaces.

More specifically, when the machining radius of the cutter 310 moves to the edges of the workpiece 20, the first drive mechanism 130 drives the rotary table 400 to enable the workpiece 20 to rotate about the axis Z. The second drive mechanism 320 drives the cutter 310 to move vertically along the axis Z, so as to change the machining depths of the cutter 310 on the edge curved surfaces of the workpiece 20, and to change the different axis Z coordinate values of the machining sites. The first drive mechanism 130 drives the rotary table 400 to enable the workpiece 20 to rotate, meanwhile, the second drive mechanism 320 drives the cutter 310 to move along the X direction in the horizontal plane, so as to achieve the curved surface machining to the edges of the workpiece 20 on different positions. In the machining process to the partial top surface and the edge curved surfaces, from the top view, the machining path of the cutter 310 is also a spiral path.

Referring to FIG. 4, when the rotary table 400 is rotated to an edge 21 of the workpiece 20, the cutter 310 is moved along the machining path R to the edge 21 of the workpiece 20, and also moved to an edge point E, the machining depth of the cutter 310 depends on the axis Z coordinate value determined by planer coordinates of the machining site of the machining path R on the horizontal plane XY. The cutter 310 is driven to change the machining depth on the different machining site on the horizontal plane XY of the path R according to the different axis Z coordinate value, so as to lower the cutter 310. When the cutter 310 is moved to the last point F of the machining path R, the cutter 310 is suspended for a while, then is moved to another side of the same edge 21, so as to raise the cutter 310 along a reversed path.

After the corners of the workpiece 20 are machined, the second drive mechanism 320 is controlled to drive the cutter 310 to move along the axis X in the horizontal plane, the first drive mechanism 130 drives the rotary table 400 to move along the axis Y in the horizontal plane, so as to position the cutter 310 directly above the geometric center of the machining area of the workpiece 20. Then the second drive mechanism 320 drives the cutters 310 to perform a turning and milling machining to the top surface of the workpiece 20, meanwhile, the cutter 310 moves along the axis X in the horizontal plane, so as to make the machining path a spiral path, and to achieve the turning and milling machining to the top surface of the workpiece 20.

During the machining to the edge curved surfaces of the workpiece 20, the remaining top surface of the workpiece 20 is machined. Since the curved surfaces of the four corners of the workpiece 20 are complex, when the cutter 310 is moved to the first machining position, the workpiece 20 rotates at a slower speed in the first turn, after the first turn, the cutting radius of the cutter 310 is gradually changed until the machining to the four corners is completed, the cutting radius is change via moving the cutter 310 in the horizontal plane XY after finishing each turn. For example, the cutting radius is changed via the movement of the cutter 310 along the direction of the axis X driven by the second drive mechanism 320, or via the movement of the rotary table 400 along the direction of the axis Y driven by the first drive mechanism 130. Then, the cutter 310 driven by the second drive mechanism 320, the rotary table 400 moves along the axis Y, such that the cutter 310 is positioned at the geometric center of the machining area of the workpiece 20. Referring to FIG. 3, before the machining is started, the cutter 310 is at the center, when the turning and milling machining is started, the cutter 310 is changed along the axis X in the horizontal plane, so as to change the cutting radius in a spiral form and perform machining. Since the cutting radius increases and the workpiece 20 remains rotating, a spiral machining area is formed on the top surface of the workpiece 20. The machining to the curved surfaces of the corners takes about 1 minute, and the machining to the overall workpiece 20 takes about 3 minutes. During the machining to the top surface of the workpiece 20, the cutter 310 is immobilized at the direction of the axis Z, the cutting radius is changed via the movement of the cutter 310 along the axis X. When the machining radius reaches the edges of the workpiece 20 to achieve a curved surface machining, the cutter 310 will move along the axis Z, so as to lower and rise the cutter 310. Compared with the conventional turning and milling method which takes about 15 minutes, the system and method according to the illustrated embodiment increases the machining speed by several times, and greatly improves the machining efficiency.

Specifically, the cutting edge of the cutter 310 can have a variable diameter, for example, can be a spiral cutting edge.

The cutting radius of the cutter 310 is half of a diagonal length of the top surface of the workpiece 20 when the cutter 310 is driven by the second drive mechanism 320 to move to the first machining position, such that a larger area of the corner can be machined.

According to the turning and milling method according to the illustrated embodiment, the first drive mechanism 130 drives the rotary table 400 to enable the workpiece 20 to rotate, the cutter 310 moves vertically during the machining to the corner and edge curved surfaces, and the cutter 310 cuts the workpiece 20 during the vertically movement, so as to form corresponding curved surfaces on the corners and edges of the workpiece 20. The first drive mechanism 130 enables the workpiece 20 and the second drive mechanism 320 drives the cutter 310 to engage with, such that the processing and turning and milling machining to the complex surfaces of the workpiece 20, the process is simplified, and the machining procedures and time are reduced. Since the cutter 310 moves vertically in a high frequency, during the rotating of the workpiece 20, the machining radius of the cutter 310 is also gradually changed, so as to quickly achieve the curved surface machining to the workpiece 20. The machining efficiency is improved by at least five times, the need of machining a large amount of the workpieces 20 is satisfied. The surface roughness and the surface profile of the machined workpiece are greatly reduced, and the quality of the super-fine grinding can be achieved, and the error between the standard curved surface and the curved surface profile is greatly reduced.

The technical features of the embodiments described above can be arbitrarily combined. In order to make the description succinct, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

What is claimed is:

1. A turning and milling method, comprising:
    positioning a workpiece on a work station of a rotary table, and causing a to-be-machined surface of the workpiece to protrude from the rotary table, wherein the workpiece has a top surface, a lower surface, corners connecting the top and lower surfaces, and edges connecting the top and lower surfaces, the edges also interconnecting the corners;
    establishing a three-dimensional coordinate system O-XYZ, wherein axis Z is a vertical axis passing through a geometric center O of a machining area of the workpiece, axis X and axis Y are horizontal axes perpendicular to each other;
    inputting parameters of a model workpiece into a control terminal, calculating axis Z coordinate values corresponding to the top surface and to curved surfaces at the edges of the workpiece according to the inputted parameters, then obtaining machining depths of a cutter at different positions along the axis Z; and
    setting a variation rate of a machining radius of the cutter that is a distance between the cutter and the geometric center O of the machining area and setting a rotation frequency of the rotary table, and driving the cutter to perform machining, wherein the machining successively includes machining of the corners of the workpiece, turning and milling of the top surface, and machining of the curved surfaces at the edges of the workpiece;
    during the machining of the corners of the workpiece: a second drive mechanism is controlled to drive the cutter to move to a first machining position of one of the corners of the workpiece, and the second drive mechanism is also controlled to drive the cutter to move vertically according to machining depths on the axis Z corresponding to different machining positions of the corners of the workpiece, and when a first drive mechanism is controlled to drive the rotary table to cause the workpiece to rotate about the vertical axis of the workpiece, the second drive mechanism drives the cutter to gradually reduce the machining radius until the machining of the corners of the workpiece is completed.

2. The method according to claim 1, wherein after the machining of the corners of the workpiece is completed, the turning and milling of the top surface of the workpiece comprises:
    the second drive mechanism drives the cutter to move along the axis X, such that the cutter is positioned at the geometric center O of the machining area of the workpiece, and when the second drive mechanism drives the cutter to move horizontally along the top surface of the workpiece so as to gradually increase the machining radius, the first drive mechanism drives the rotary table to drive the workpiece to rotate horizontally about the axis Z, so as to achieve the turning and milling of the top surface of the workpiece along a spiral path about the geometric center O with the machining depth of the cutter on the axis Z being constant.

3. The method according to claim 1, wherein during the machining of the curved surfaces at the edges of the workpiece, the second drive mechanism further determines the axis Z coordinate values according to a desired machining path of the workpiece obtained from the control terminal, so as to change the machining depth of the cutter in real time when the cutter performs machining of the curved surfaces at the edges of the workpiece.

4. The method according to claim 3, wherein after the machining radius of the cutter is increased during the machining of the curved surfaces at the edges of the workpiece, a machining process of the curved surfaces at the edges of the workpiece and a part of the top surface of the workpiece is carried out and comprises:

the first drive mechanism drives the rotary table to cause the workpiece to rotate about the axis Z, the second drive mechanism drives the cutter to move vertically along the axis Z according to the axis Z coordinate values of each of machining positions of the part of the top surface and of the curved surfaces at the edges of the workpiece, so as to raise and lower the cutter according to different machining depths; and when the first drive mechanism drives the rotary table to cause the workpiece to rotate, the second drive mechanism drives the cutter to gradually increase the machining radius until the machining of both the part of the top surface of the workpiece and the curved surfaces at the edges of the workpiece is completed.

5. The method according to claim 1, wherein the machining radius of the cutter is equal to half of a diagonal length of the top surface of the workpiece when the cutter is driven by the second drive mechanism to move to the first machining position.

6. The method according to claim 1, wherein the second drive mechanism drives the cutter to move vertically at a frequency greater than or equal to 400 times per minute to achieve the machining of the corners of the workpiece and the curved surfaces at the edges of the workpiece by the cutter.

7. The method according to claim 1, wherein during rotation of the rotary table, a rotational frequency of the rotary table is controlled to be 20 to 40 rpm when the cutter performs the machining of the corners of the workpiece.

8. A turning and milling method, comprising:

positioning a workpiece on a work station of a rotary table, and causing a to-be-machined surface of the workpiece to protrude from the rotary table, wherein the workpiece has a top surface, a lower surface, corners connecting the top and lower surfaces, and edges connecting the top and lower surfaces, the edges also interconnecting the corners;

establishing a three-dimensional coordinate system O-XYZ, wherein axis Z is a vertical axis passing through a geometric center O of a machining area of the workpiece, axis X and axis Y are horizontal axes perpendicular to each other;

inputting parameters of a model workpiece into a control terminal, calculating axis Z coordinate values corresponding to the top surface and curved surfaces at the edges of the workpiece according to the inputted parameters, then obtaining machining depths of a cutter at different positions along the axis Z; and setting a variation rate of a machining radius of the cutter that is a distance between the cutter and the geometric center O of the machining area, and setting a rotation frequency of the rotary table and, driving the cutter to perform machining, wherein the machining successively includes machining of the corners of the workpiece, turning and milling of the top surface, and machining of the curved surfaces at the edges of the workpiece;

during the machining of the corners of the workpiece: the cutter is positioned at a first machining position of one of the corners of the workpiece, and a second drive mechanism is also controlled to drive the cutter to move vertically according to machining depths on the axis Z corresponding to different machining positions of the corners of the workpiece, and when a first drive mechanism is controlled to drive the rotary table to cause the workpiece to rotate about the vertical axis of the workpiece, the second drive mechanism drives the cutter to gradually reduce the machining radius until the machining of the corners of the workpiece is completed.

9. The method according to claim 8, wherein after the machining of the corners of the workpiece is completed, the turning and milling of the top surface of the workpiece comprises:

the second drive mechanism drives the cutter to move along the axis X, such that the cutter is positioned at the geometric center O of the machining area of the workpiece, and when the second drive mechanism drives the cutter to move horizontally along the top surface of the workpiece so as to gradually increase the machining radius, the first drive mechanism drives the rotary table to cause the workpiece to rotate horizontally about the axis Z, so as to achieve the turning and milling of the top surface of the workpiece along a spiral path about the geometric center O with the machining depth of the cutter on the axis Z being constant.

10. The method according to claim 8, wherein during the machining of the curved surfaces at the edges of the workpiece, the second drive mechanism further determines the axis Z coordinate values according to a desired machining path of the workpiece obtained from the control terminal, so as to change the machining depth of the cutter in real time when the cutter performs machining of the curved surfaces at the edges of the workpiece.

11. The method according to claim 10, wherein after the machining radius of the cutter is increased during the machining of the curved surfaces at the edges of the workpiece, a machining process of the curved surfaces at the edges of the workpiece and a part of the top surface of the workpiece is carried out and comprises:

the first drive mechanism drives the rotary table to cause the workpiece to rotate about the axis Z, the second drive mechanism drives the cutter to move vertically along the axis Z according to the axis Z coordinate values of each of machining positions of the part of the top surface and of the curved surfaces at the edges of the workpiece, so as to raise and lower the cutter according to different machining depths; and when the first drive mechanism drives the rotary table to cause the workpiece to rotate, the second drive mechanism drives the cutter to gradually increase the machining radius until the machining of both the part of the top surface of the workpiece and the curved surfaces at the edges of the workpiece is completed.

12. The method according to claim 8, wherein the second drive mechanism drives the cutter to move vertically at a frequency greater than or equal to 400 times per minute to achieve the machining of the corners of the workpiece and the curved surfaces at the edges of the workpiece.

\* \* \* \* \*